United States Patent
Kozak et al.

(10) Patent No.: US 10,655,957 B2
(45) Date of Patent: May 19, 2020

(54) METHOD FOR CHARACTERIZING A TRAILER ATTACHED TO A TOWING VEHICLE, DRIVER ASSISTANCE SYSTEM, AS WELL AS VEHICLE/TRAILER COMBINATION

(71) Applicant: VALEO Schalter und Sensoren GmbH, Bietigheim-Bissingen (DE)

(72) Inventors: Ondrej Kozak, Prague (CZ); Petr Krejci, Prague (CZ); Yaron Sela, Prague (CZ); Pavel Zednik, Prague (CZ)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 26 days.

(21) Appl. No.: 16/003,236

(22) Filed: Jun. 8, 2018

(65) Prior Publication Data

US 2018/0356214 A1 Dec. 13, 2018

(30) Foreign Application Priority Data

Jun. 9, 2017 (DE) .......................... 10 2017 112 786

(51) Int. Cl.
| | | |
|---|---|---|
| *G01B 11/27* | (2006.01) | |
| *G01S 7/48* | (2006.01) | |
| *G01S 17/931* | (2020.01) | |
| *G01S 17/06* | (2006.01) | |
| *B62D 15/02* | (2006.01) | |

(52) U.S. Cl.
CPC .......... *G01B 11/272* (2013.01); *G01S 7/4808* (2013.01); *G01S 17/06* (2013.01); *G01S 17/931* (2020.01); *B60Y 2200/147* (2013.01); *B62D 15/024* (2013.01)

(58) Field of Classification Search
None
See application file for complete search history.

(56) References Cited

U.S. PATENT DOCUMENTS

| | | | |
|---|---|---|---|
| 10,106,193 B2* | 10/2018 | Lavoie | ................... B62D 13/06 |
| 2011/0181457 A1 | 7/2011 | Basten | |
| 2014/0277942 A1* | 9/2014 | Kyrtsos | ................... G01B 21/02 |
| | | | 701/41 |
| 2017/0320518 A1* | 11/2017 | Lavoie | ................... B62D 13/06 |

(Continued)

*Primary Examiner* — Shawn Decenzo
(74) *Attorney, Agent, or Firm* — Osha Liang LLP (57) ABSTRACT

A method for characterizing a trailer attached to a towing vehicle having a kinematic model describing the trailer, a driver assistance system, and a vehicle/trailer combination are disclosed. The method includes: receiving lidar sensor data of a lidar sensor device of the towing vehicle from an environmental region of the towing vehicle and the attached trailer and identifying detection points corresponding to reflection points in the environmental region in the lidar sensor data; determining at least one model sub-region at least partially overlapping with the kinematic model; classifying the detection points lying within the model sub-region as detection points corresponding with the trailer; determining at least one feature of the trailer based on detection points corresponding with the trailer; comparing the at least one feature with the kinematic model; and updating the kinematic model based on the comparison of the at least one feature with the kinematic model.

15 Claims, 2 Drawing Sheets

(56) References Cited

U.S. PATENT DOCUMENTS

| | | | |
|---|---|---|---|
| 2018/0045823 A1* | 2/2018 | Prasad | G01S 7/411 |
| 2018/0050626 A1* | 2/2018 | Delp | G06Q 10/0631 |
| 2018/0068566 A1* | 3/2018 | Prasad | G08G 1/167 |
| 2018/0127024 A1* | 5/2018 | Pourrezaei Khaligh | B60D 1/246 |
| 2019/0170867 A1* | 6/2019 | Wang | B60D 1/245 |

* cited by examiner

METHOD FOR CHARACTERIZING A TRAILER ATTACHED TO A TOWING VEHICLE, DRIVER ASSISTANCE SYSTEM, AS WELL AS VEHICLE/TRAILER COMBINATION

BACKGROUND OF THE INVENTION

The invention relates to a method for characterizing a trailer attached to a towing vehicle, in which a kinematic model describing the trailer is given. The invention moreover relates to a driver assistance system for a vehicle/trailer combination formed from a towing vehicle and a trailer as well as vehicle/trailer combination.

It is already known from the prior art to support a driver of a vehicle/trailer combination formed by a towing vehicle and a trailer in maneuvering with the vehicle/trailer combination. For instance the driver can be supported in reversing with the vehicle/trailer combination in that a driving trajectory for the trailer is determined, which describes a anticipated motion of the trailer. This driving trajectory can be displayed to the driver for instance on an onboard display device. For predicting the motion of the trailer, in particular, properties of the trailer, such as geometric dimensions of the trailer, are required. These can for instance be manually entered by the driver of the towing vehicle.

It is also known to determine a length of the trailer automatically. For this purpose in the US 2011/0181457 A1 a vehicle length sensor for a vehicle of variable length is described. Such vehicle with variable length can for instance be a truck. In the US 2014/0277942 A1, a vehicle system for estimating a trailer length is described. For this purpose the system comprises a plurality of sensors, which are configured to measure a steering angle of the towing vehicle and a hitch angle of the trailer. By means of a kinematic model of the trailer and the vehicle, which correlates the hitch angle and the steering angle to a length of the trailer, the length can be calculated. According to the prior art consequently a plurality of sensors are envisaged at the vehicle/trailer combination, in order to be able to determine the length of the trailer correctly.

SUMMARY OF THE INVENTION

It is the object of the present invention to provide a solution as how to be able to characterize a trailer coupled to a towing vehicle in a particularly simple and precise way.

According to the invention, this object is solved by a method, by a driver assistance system as well as by a vehicle/trailer combination with the features according to the respective independent patent claims. Advantageous embodiments of the invention are subject matter of the dependent patent claims, the description, and the figures.

According to the embodiment of a method for characterizing a trailer attached to a towing vehicle, a kinematic model describing the trailer is specified. In particular, lidar sensor data of a lidar sensor device of the towing vehicle are received from an environmental region of the towing vehicle and the attached trailer, and detection points corresponding to reflection points from the environmental region are identified in the lidar sensor data. Moreover, in particular, at least one model sub-region at least partially overlapping with the kinematic model, the detection points located within the model sub-region are classified as detection points corresponding with the trailer, and at least one feature of the trailer is determined based on the detection points corresponding with the trailer. The at least one feature can be compared with the kinematic model and the kinematic model can be updated based on a comparison of the at least one feature with the kinematic model.

According to a particularly preferred embodiment of a method for characterizing a trailer attached to a towing vehicle a kinematic model describing the trailer is specified. Thereby the lidar sensor data of a lidar sensor device of the towing vehicle are received from an environmental region of the towing vehicle and the attached trailer, and detection points corresponding to reflection points from the environmental region are identified in the lidar sensor data. Moreover, at least one model sub-region overlapping at least partially with the kinematic model is determined, detection points located within the model sub-region are classified as detection points corresponding with the trailer and at least one feature of the trailer is determined on the basis of the detection points corresponding with the trailer. The at least one feature is compared with the kinematic model and the kinematic model is updated based on the comparison of the at least one feature with the kinematic model.

By means of the method a driver of a vehicle/trailer combination formed by the towing vehicle and the trailer can be supported in maneuvering with the vehicle/trailer combination. The vehicle/trailer combination may for instance comprise a motor vehicle in the form of a passenger car as well as a trailer, for instance a caravan or a horse trailer. Also the vehicle/trailer combination may be a truck/trailer combination comprising a truck and at least one trailer or a semi-trailer truck comprising a truck and a semi-trailer. Further, the combination may comprise a motorcycle as well as a trailer coupled to the motorcycle. For supporting the driver, the vehicle/trailer combination is characterized based on lidar sensor data, wherein the characterization of the trailer is in particular provided to a driver assistance system of the vehicle/trailer combination in the form of the kinematic model. A control device of the driver assistance system can pursue or track the trailer and anticipate a motion of the trailer based on the kinematic model. Based on the anticipated motion of the trailer, the driver assistance system can perform an assistance function, for instance visualizing the expected motion of the trailer on a display device to the driver. Thus the driver can be supported, for instance, in reversing with the vehicle/trailer combination.

Thereby, the lidar sensor data are received by a receive unit of the lidar sensor device of the towing vehicle. The lidar sensor device is in particular arranged on a lateral region of the towing vehicle, for instance on a side mirror of the towing vehicle, wherein the trailer at least partially is situated within a detection region of the lidar sensor device. For instance, the lidar sensor device can emit light pulse in the direction of the trailer and receive the light pulse reflected at least partially at the trailer as the lidar sensor data again. The reflected light pulse can be received in multiple light beams, for instance in sixteen light beams. Every light beam in this connection is a partial portion of the reflected light pulse. For receiving the light beams of the reflected light pulse, the lidar sensor device, which is for instance configured as a solid state lidar sensor device, can comprise a receiving device with several receiving elements, for instance with sixteen receiving elements. The receiving elements can for instance comprise photodetectors in the form of light-sensitive semi-conductor components, for example photodiodes. The receiving elements can for instance be arranged in a matrix, i.e. in columns and/or lines. Every receiving element in this connection can be assigned to a reflection direction or a reflection angle. In particular, a receiving element receives only light beams, which fall upon the lidar sensor device from the reflection direction associated with the receiving element.

A light beam describes the course of the intensity of the reflected light, i.e. the distribution of the intensity values over time. This course can be examined for intensity peaks, which are capable of being identified as maximum values of the intensity in the course. These intensity peaks represent the detection points or detections, so-called echoes, which correspond to reflection points in the environmental region. Such a reflection point can for instance be a point on the side wall of the trailer. In this connection position values for the detection points can be determined, which for instance describe the spatial position of the reflection points relative to the towing vehicle. For determining the position values for the detection points a respective distance value as well as a respective reflection angle are determined. The distance value for a detection point can be determined via time-of-flight measurements based on a point in time or time stamp associated with the detection point. Since, in particular, a reflection direction is assigned to each receiving element, i.e. each receiving element corresponds with a certain reflection angle, the reflection angle can be determined for the detection point in addition to the distance value on the basis of the receiving element.

The kinematic model of the trailer is updated based on the lidar sensor data, for instance by the control device of the driver assistance system. For the case that no updatable kinematic model is given, same can be established for the first time based on the detection points of the lidar sensor data. In this connection a frame enclosing the detection points corresponding with the trailer is predetermined. For this purpose those detection points can be identified based on the position values of the detection points, which probably pertain to the trailer. For instance those detection points are identified on the basis of the respective position values, which are situated in a certain distance range behind the towing vehicle. These detection points can be clustered or grouped. For the cluster an enveloping frame or an envelope, for instance with a rectangular shape, is determined. This enveloping frame can then be given as kinematic initial model of the trailer. In particular, a spatial position of the trailer relative to the towing vehicle as well as a geometry of the trailer are given by the kinematic model. On the basis of the kinematic model, in particular, a motion of the trailer can be predicted or determined.

In dependence on the kinematic model of the trailer the model sub-region is determined. The model sub-region describes a region relative to the kinematic model of the trailer, within which the trailer may be deviated from the kinematic model. The model sub-region also represents a tolerance range, within which detection points, even if situated outside the kinematic model, are identified as pertaining to the trailer. Then, for instance on the basis of the position values of the detection points, those detection points are identified, which lie within the model sub-region. These detection points are assumed to correspond to actual reflection points on the surface of the trailer. On the basis of these detection points the at least one feature of the trailer, for instance a section of a contour or an outline of the trailer, can be determined. This feature is compared with the kinematic model. In the case of a difference between the kinematic model and the at least one feature the kinematic model is updated. The difference can derive, for instance, from a changed trailer angle of the trailer relative to the towing vehicle. Thus, for instance, the new trailer angle for the kinematic model can be determined on the basis of the difference and stored in the updated kinematic model. The kinematic model consequently can be updated in dependence on the difference between the non-updated kinematic model and the at least one feature. Thereby, the lidar sensor data of the lidar sensor device are sufficient for updating the kinematic model.

This results in the advantage that no plurality of sensors needs to be provided at the towing vehicle and at the trailer for updating the kinematic model. Thus, no communication between sensors of the towing vehicle and sensors of the trailer is required. Moreover, no input by the driver of the vehicle/trailer combination is required to define properties of the trailer. Only at most one lidar sensor device, for example at the side area of the towing vehicle, is required in order to be able to characterize the trailer. The method is thus particularly simple and inexpensive.

Particularly preferably, the steps described in the above are performed during respective characterization cycles for characterizing the trailer, wherein the updated kinematic model determined during a characterization cycle is given for a subsequent characterization cycle for re-updating of the kinematic model. The return of the updated kinematic model to a further characterization cycle corresponds to a feedback. In particular, in each update cycle, the feature of the trailer is updated and compared with the non-updated kinematic model. Based on the comparison between the updated feature and the non-updated kinematic model, the kinematic model is then updated. The continuous updating of the feature results in the advantage that the kinematic model continuously can be updated in dependence on the lidar sensor data and can be used for determining a new kinematic model. A current position as well as a geometry of the trailer thus can be continuously determined with high precision.

It may be envisaged that as the at least one model sub-region at least one model area is determined, by which an edge of the kinematic model characterizing a wall of the trailer is framed. In particular, a position of the model area and thus the edge to be framed is determined in dependence on an attachment place of the lidar sensor device on the towing vehicle. The trailer can, for instance, have a rectangular contour and two opposite side walls, extending along a longitudinal axis of the trailer, a front side or front wall as well as a back side or rear wall. In the kinematic model the trailer can be represented in the form of a rectangle, wherein the side walls, the front wall, and the rear wall are represented as respective edges. By the model sub-region now in particular one of the edges is framed. The model area consequently can comprise the edge itself as well as areas adjoining the edge. Also multiple model sub-regions can be determined, wherein each model sub-region is formed, in particular, by a model area framing one of the edges. Thereby, in particular, those edges of the model areas are framed, which correspond with a wall of the trailer lying within the capture region of the lidar sensor device. In the case of a lidar sensor device arranged in a right side mirror of the towing vehicle, for instance, the front edge as well as the right side edge of the model are framed by the model area.

Preferably, at least one line fit is determined on the basis of the detection points corresponding with the trailer of the at least one model sub-region, wherein a wall area of the trailer is characterized by the at least one line fit and the at least one feature is determined on the basis of the at least one line fit. The line fit can for instance be determined by way of curve fitting, in particular be iterative curve fitting, based on the detection points. In particular, intensity values are determined for the detection points within the model sub-region, the detection points filtered prior to determining the line fit by comparing the intensity values with a relative intensity threshold value, which is determined based on the intensity values of the detection points within the model sub-region, and the line fit is determined on the basis of the filtered detection points. The relative intensity threshold value can for instance be determined as the mean value of the intensity values within the model sub-region. By the filtering of the detection points within the model sub-region detection points, which originate from highly reflective objects in the environmental region of the vehicle/trailer combination, but not from the trailer, can be removed.

By the iterative adjustment of the line fit, i.e. the iterative curve fitting, those detection points within the model sub-region can be identified, which are not consistent with the line fit or are not represented by the line fit. These detection points can be identified as not belonging to the trailer and can be removed. Also the model sub-region can be enlarged adaptively, for instance on the basis of detection points, which do lie outside the predetermined model sub-region, but are consistent with the determined line fit or are represented by the line fit. The line fit represents the wall area of the trailer. In particular, the line fits for at least two model sub-regions, for instance for the model sub-region framing the right edge and for the model sub-region framing the front edge, are determined. Thus, an L-shaped line can be determined as the feature of the trailer. The L-shaped line, for instance, represents an area of the front wall as well as the right side wall of the trailer.

Particularly preferably, the kinematic model is determined as a function of a geometric model of the trailer comprising at least one geometric parameter and as a function of at least one kinematic parameter. For updating the kinematic model, the geometric model and/or the at least one kinematic parameter is updated based on the comparison of the at least one feature with the kinematic model. By the at least one kinematic parameter, a current position as well as a movement of the trailer relative to the towing vehicle can be described. By the geometric model, a shape or a geometry as well as a construction design of the trailer can be described. The geometric model can be determined and updated separately, for instance by means of the feature extraction of the at least one feature of the trailer on the basis of lidar sensor data. Additionally, the at least one kinematic parameter can also be determined and updated based on the at least one feature determined on the basis of the lidar sensor data. Based on the updated geometric model and/or the at least one updated kinematic parameter the kinematic model can be updated and in a following characterization cycle, in which the geometric model and/or the at least one kinematic parameter are updated again for updating the kinematic model, can then be specified.

Thereby, it may be envisaged that as the at least one kinematic parameter a trailer angle between the trailer and the towing vehicle and/or a change of the trailer angle and/or a wheelbase of the trailer is determined and the at least one kinematic parameter is updated based on the comparison of the at least one feature and the kinematic model. Thus, for updating the at least one kinematic parameter, the trailer angle between trailer and towing vehicle and/or the change of the trailer angle and/or the wheelbase of the trailer are updated based on the comparison of the at least one feature and the kinematic model. In order to determine the trailer angle or the change of the trailer angle, for example, the line fit which describes the side wall of the trailer can be compared with that edge of the kinematic model which corresponds to the side wall of the trailer. An angle of the line fit can be inputted into the kinematic model, which then estimates the trailer angle as well as a rate of change of the trailer angle.

In a further development of the invention, as the at least one geometric parameter a geometric dimension of the trailer and/or a length of a trailer coupling and/or a position of at least one pivot point of the trailer and/or a kind of a coupling device of the trailer for attaching to the towing vehicle is determined and the at least one geometric parameter based on the comparison of the at least one feature and the kinematic model updated. As the at least one geometric dimension, for instance, a length and/or a width of the trailer can be determined. The position of the pivot point can be determined as a position of a front corner of the trailer. This corner can for instance be recognized on the basis of the at least one feature of the trailer in the form of the L-shaped line. The length of the trailer can for instance be determined as a length of the line fit representing the side wall of the trailer. The width of the trailer can be determined based on a length of the line fit representing the front wall. Moreover, the kind of the coupling device of the trailer is determined, via which the trailer is coupled with the towing vehicle. In particular it is determined whether the coupling device is a gooseneck or a drawbar (coupling bar). If, for instance, a width of the trailer determined on the basis of the at least one feature is unrealistic, it can be assumed that the kind of coupling device in the current kinematic model is faulty. The kinematic model is updated to the effect that the kind of coupling device in the current kinematic model is changed in the respectively other way of the coupling device, i.e. for instance from a regular drawbar to the gooseneck.

It proves advantageous if the at least one geometric dimension is only updated on the basis of the comparison of the at least one feature with the kinematic model, if the at least one geometric parameter is larger than a predetermined threshold value. This embodiment is based on the insight that in the case of particularly small trailer angle, for instance during straight driving of the vehicle/trailer combination, a rear boundary of the trailer, for instance a rear corner of the trailer, is not situated within the detection region of the lidar sensor device. The lidar sensor data received from the lidar sensor device consequently do not comprise any detection points corresponding to the rear corner of the trailer. Thus, the length of the trailer cannot be correctly determined on the basis of the at least one feature characterizing the side wall of the trailer. For instance, the length determined on the basis of the feature can have an unrealistically low value. In order not to take this unrealistic value erroneously as actual updated value of the geometric dimension, the kinematic model is not updated, in case the value is lower than the predetermined threshold value. The kinematic model accordingly is only updated, if in particular the length of the trailer exceeds the determined threshold value. The threshold value can for instance be determined in dependence on a wheelbase of the trailer. It can namely be assumed that the length of the trailer is larger than the wheelbase of the trailer and for instance amounts to at least one and a half times the wheelbase.

In an advantageous further development of the invention the kinematic model additionally is determined and updated in dependence on odometry data of the towing vehicle, in particular a speed of the towing vehicle and/or a steering angle of the towing vehicle. For instance, through the odometry data a change of the trailer angle between the towing vehicle and the trailer resulting from a change of the steering angle of the towing vehicle can be determined and be used for updating the kinematic model. On the basis of the odometry data, the data captured by the lidar sensor device can be verified and examined in an advantageous way. The kinematic model is updated, in particular, only based on the lidar sensor data and the odometry data. Thus, in particular, no further sensor data are required and no communication with the trailer is necessary.

It is advantageous if in the event that no feature of the trailer for updating the kinematic model is determinable based on the lidar sensor data, the kinematic model is updated only based on the odometry data of the towing vehicle. Thus, for instance, a full updating mode and a limited, standalone mode can be provided for the control device of the driver assistance system. In the full updating mode, the kinematic model is updated on the basis of the lidar sensor data, for instance by updating the kinematic parameter, in particular trailer angle, and/or by updating the geometric model. In the limited standalone mode, the at least one kinematic parameter and/or the geometric model of the trailer is estimated only on the basis of the odometry data. This is particularly advantageous if for instance no lidar sensor data or only very noisy lidar sensor data are available, on the basis of which the kinematic model cannot be reliably updated. For instance, the current trailer angle of the trailer can be determined or estimated based on the current steering angle of the towing vehicle updated on the basis of the odometry data. Based on the current steering angle, the kinematic model can be updated. This results in the advantage that the trailer can be pursued or tracked, i.e. a position of the trailer be determined, if the trailer itself is not visible to the lidar sensor device. This can for instance be the case if the towing vehicle turns into the direction, in which the towing vehicle has no lidar sensor device for capturing lidar sensor data of the trailer.

Preferably, the kinematic model is implemented as augmented Kalman filter, wherein the at least one kinematic parameter and the at least one geometric parameter are defined as internal states and the internal states are updated based on the lidar sensor data and/or based on odometry data of the towing vehicle. The kinematic model is in particular a non-linear and non-holonomic parametric system, whose state trajectory or history is crucial. In particular, it is envisaged that a wheelbase of the trailer is implemented as an augmented state in the Kalman filter, which is updated only on the basis of the feature of the trailer determined on the basis of the lidar sensor data. If the full updating mode is selected, the trailer angle is updated on the basis of the lidar sensor data. This trailer angle is used to update the Kalman filter, in particular the augmented state of the wheelbase. If a measurement or lidar sensor data are not available, the limited standalone mode is performed, wherein internal states of the Kalman filter are updated only based on the state of the towing vehicle, i.e. based on the odometry data. During the limited standalone mode, the updating of the augmented state of the wheelbase is disabled, all other states, in particular the trailer angle, are updated. Thereby the trailer, even if it is not visible, is tracked and characterized particularly reliably.

The invention moreover relates to a driver assistance system for a vehicle/trailer combination formed by towing vehicle and a trailer, comprising at least one lidar sensor device for arranging on a towing vehicle and for capturing lidar sensor data from an environmental region of the vehicle/trailer combination, and a control device, which is configured for conducting an inventive method or an advantageous embodiment thereof. For instance, the control device can anticipate a motion path of the trailer on the basis of the continuously updated kinematic model and represent this motion path on a display device, which represents the environmental region of the vehicle/trailer combination, as an overlay.

A vehicle/trailer combination according to the invention comprises a towing vehicle, a trailer coupled to the towing vehicle, as well as a driver assistance system according to the invention. The towing vehicle can for instance be configured as a motor vehicle, a truck, or a motorcycle. The towing vehicle can for instance comprise a trailer coupling for attaching the trailer via a drawbar or a coupling bar. For instance, the towing vehicle can also comprise a loading area, via which the trailer is capable of being attached by means of a so-called gooseneck.

The embodiments and their advantages presented with regard to the method according to the invention apply in analogy to the driver assistance system according to the invention as well as to the vehicle/trailer combination according to the invention.

By indications "left", "right", "front", "rear", etc. positions and orientations from the perspective of an observer looking in the longitudinal direction of the vehicle are indicated.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

The invention is explained in more detail on the basis of preferred exemplary embodiments and with reference to the attached drawings.

BRIEF DESCRIPTION OF THE DRAWINGS

These show in

DETAILED DESCRIPTION

In the figures identical as well as functionally identical elements are equipped with the same reference signs.

Figure 1:
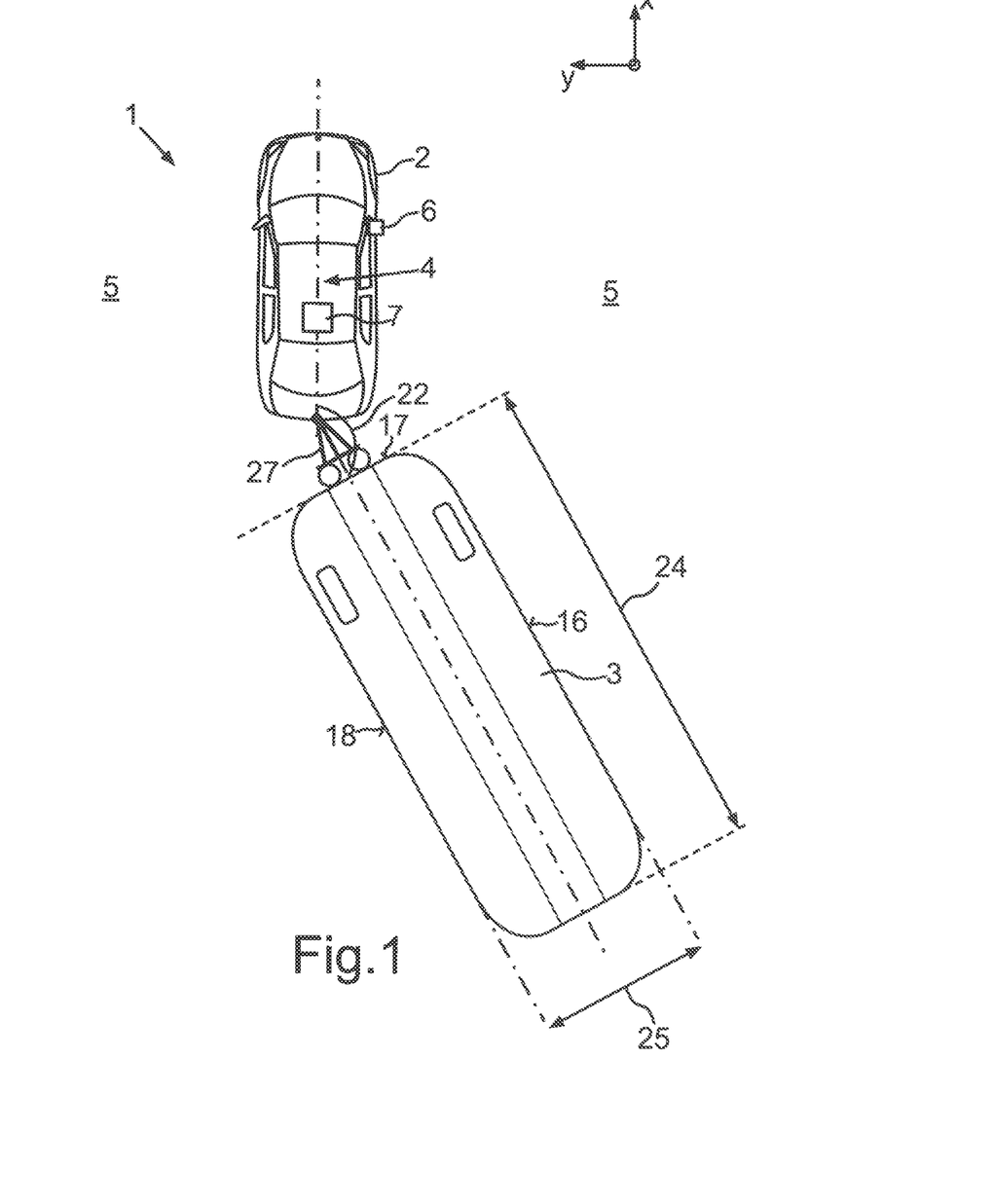
FIG. 1 a schematic representation of an embodiment of a combination according to the combination.

FIG. 1 shows a vehicle/trailer combination 1 according to the present invention in a plan view. The vehicle/trailer combination 1 is formed by a towing vehicle 2 as well as a trailer 3 attached to the towing vehicle 2. Here, the towing vehicle 2 is formed as a motor vehicle in the form of a passenger car. The trailer 3 can for instance be a caravan or a horse trailer. The vehicle/trailer combination 1 comprises a driver assistance system 4, which is configured to support a driver of the vehicle/trailer combination 1 in maneuvering with the vehicle/trailer combination 1. For instance, the driver can be supported in reversing with the vehicle/trailer combination 1. The trailer 3 here is coupled via a trailer coupling to the towing vehicle 2 and thus is mounted relative to the towing vehicle 2. The driver can be supported by the driver assistance system 4, for instance, in such a way that a driving trajectory is determined for the trailer 3, which describes an anticipated motion of the trailer 3 in dependence on a current driving direction of the towing vehicle 2.

For this purpose the driver assistance system 4 comprises a lidar sensor device 6, which here is arranged on a right side mirror of the towing vehicle 2 and whose viewing direction is directed backwards (negative x-direction) in the direction of the trailer 3. Alternatively or additionally, a lidar sensor device 6 can be arranged on a left side mirror of the towing vehicle 2. It can also be provided that a lidar sensor device 6 is arranged on a rear bumper of the towing vehicle 2 and/or in rear lamps of the towing vehicle 2. The trailer 3 is at least in partially located within a detection region of the lidar sensor device 6. The lidar sensor data captured by the lidar sensor device 6 from an environmental region 5 of the vehicle/trailer combination 1 can be transferred to a control device 7 of the driver assistance system 4.

Figure 2:
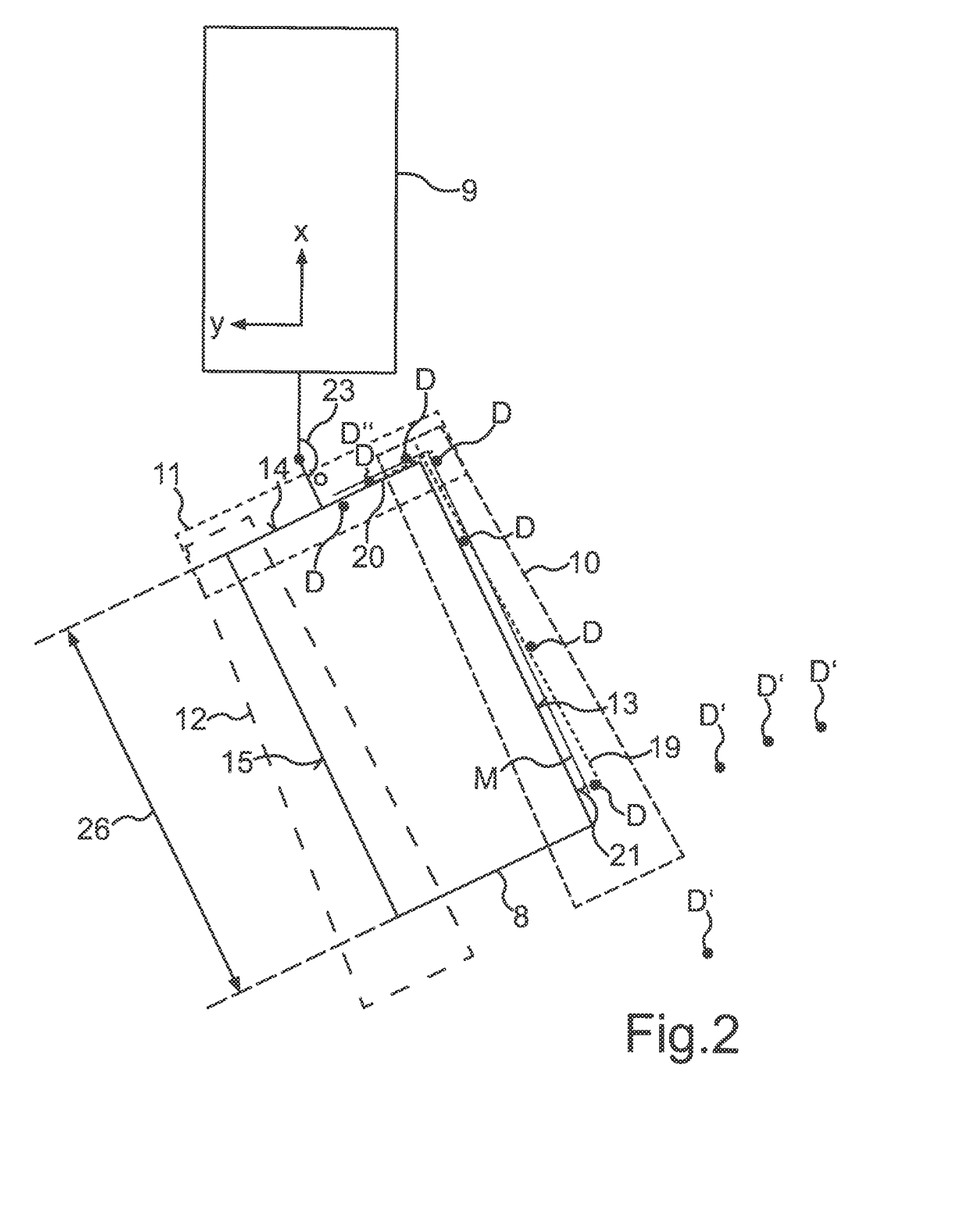
FIG. 2 a schematic representation of an embodiment of a kinematic model of the combination.

For characterizing the trailer 3, a kinematic model 8 of the trailer 3, as shown in FIG. 2, is established. The kinematic model 8 is in particular continuously updated. The kinematic model 8 of the trailer 3 here is represented in a coupled state with a model 9 of the towing vehicle 2. The kinematic model 8 of the trailer 3 describes a spatial position as well as a geometry or construction design of the trailer 3. On the basis of the kinematic model 8 of the trailer 3, a motion of the trailer 3 can be described. The kinematic model 8 is to be continuously updated. The control device 7 can extract features M of the trailer 3 from the lidar sensor data of the lidar sensor device 6. For this purpose, the control device 7 can identify detection points D, D', D" in the lidar sensor data, which correspond to reflection points from the environmental region 5 of the vehicle/trailer combination 1.

Moreover, at least one model sub-region 10, 11, 12 at least partially overlapping with the kinematic model 8 is determined. The model sub-regions 10, 11, 12 in this connection frame edges 13, 14, 15 of the kinematic model 8, which represent side walls 16, 17, 18 (see FIG. 1) of the trailer 3. For instance, the right side edge 13 represents a right side wall 16 of the trailer 3, the front side edge 14 represents a front wall 17 of the trailer 3 and the left side edge 15 represents a left side wall 18 of the trailer 3. Here, the right edge 13 is framed by a first model sub-region 10, the front side edge 14 is framed by a second model sub-region 11, and the left edge 15 is framed by a third model sub-region 12. The first and the third model sub-region 10, 13 are here configured to be trapezoidal, the second model sub-region 12 here is configured to be rectangular.

Now, those detection points D are identified, which pertain to the trailer 3 or correspond to the trailer 3. In other words, those detection points D are identified which originate from a reflection of the light pulse emitted by the lidar sensor device 6. Since the lidar sensor device 6 here is arranged on a right side mirror of the towing vehicle 2, the lidar sensor data merely have detection points D, D', D", which pertain to the environmental region 5 to the right of the towing vehicle 2 and the trailer 3. Thereby, the detection points D' lie in none of the model sub-regions 10, 11, 12. These detection points D' for instance originate from other objects in the environmental region 5 and therefore do not correspond to the trailer 3. These detection points D' therefore are removed or not used for updating the kinematic model 8. Based on the detection points D, D" lying in the model sub-regions 10, 11 line fits 19, 20 are determined by means of iterative curve fittings. A first line fit 19 here extends within the first model sub-region 10 and represents the right side wall 16 of the trailer 3. Half of a second line fit 20 here extends in the second model sub-region 11 and represents half the front wall 17 of the trailer 3.

A detection point D" lying within the second model sub-region 11 here cannot be imaged by the second line fit 20. These detection point D" is not classified as belonging to the trailer 3, even though it lies within the second model sub-region 11, and therefore is removed. The detection point D" can for instance be filtered out prior to determining the line fit 20 by determining intensity values for the detection points D, D" and by filtering the detection points D, D" within the respective model sub-region 10, 11, 12 by comparing the intensity values with an intensity threshold value. Thereby, the intensity threshold value can be determined separately for each model sub-region 10, 11, 12, for instance as the mean value of the intensity values of the detection points D, D" of the respective model sub-region 10, 11, 12.

From the two line fits 19, 20, a feature M of the trailer 3 can be determined, which here is imaged as an L-shaped line and represents a region of a contour of the trailer 3, her the right lateral area of the trailer 3. This feature M is now compared with the kinematic model 8. Here, the feature M differs by an angle 21 from the right side edge 13 of the trailer. This corresponds to a change of the trailer angle 22 of the trailer 3 relative to the towing vehicle in comparison with the trailer angle 23 within the non-updated kinematic model 8. For determining the current actual trailer angle 22 of the trailer 3 the trailer angle 23 stored in the kinematic model 8 as well as the angle 21 can be added. The trailer angle 22 as well as the change in the trailer angle 22 represent kinematic parameters of the kinematic model 8. In addition, a wheelbase of the trailer 3 can be determined and updated as the kinematic parameter of the trailer 3.

The kinematic model 8 can now be updated for a next characterization cycle for characterizing the trailer 3 by presetting the updated trailer angle. Also, geometric dimensions of the trailer 3, for instance a length 24 as well as the width 25 of the trailer 3, can be determined and updated on the basis of the comparison of feature M with the kinematic model 8. For this purpose, for instance, a length of the line fit 19 representing the side walls 16, 18 of the trailer 3 can be determined and the length 26 of the trailer 3 stored in the kinematic model 8 can be updated to the length of the line fit 19.

Moreover, the kinematic model 8 of the trailer 3 can also be updated in dependence on odometry data of the towing vehicle 2. In particular, the kinematic model 8 is updated only on the basis of the odometry data of the towing vehicle 2 as well as based on the feature M of the trailer 3 extracted from the lidar sensor data. The kinematic model 8 of the trailer 3 itself is in particular a non-linear, non-holonomic parameter model, whose state vector or history is crucial. The kinematic model 8 can be implemented as augmented Kalman filter, wherein the kinematic parameters are internal states of the Kalman filter. The wheelbase of the trailer 3 is determined as augmented state of the Kalman filter.

The kinematic model 8 can comprise two operating modes, namely a full updating mode as well as a limited standalone mode. The full updating mode is selected, if a valid feature M of the trailer 3 can be determined on the basis of trailer feature extraction from the lidar sensor data. This is the case if the feature M of the trailer 3 can be reliably determined on the basis of the lidar sensor data. If for instance the trailer angle 22 of the trailer 3 can be determined and updated on the basis of the captured feature M, this trailer angle 22 is used to update the Kalman filter, in particular the augmented state of the wheelbase of the trailer 3. In case no measurement is available, that is if no current trailer angle 22 between the trailer 3 and the towing vehicle 2 can be determined on the basis of the lidar sensor data, the limited standalone mode is executed. In the limited standalone mode, the internal states of the Kalman filter are determined and updated only on the basis of the odometry data of the towing vehicle 2. During the limited standalone mode, the change of the wheelbase, that is the updating of the augmented state of the wheelbase, is disabled. All other states, for instance the trailer angle 22, however, are updated. This means that the trailer 3 can be pursued or tracked if it is not visible and is situated outside the detection region of the lidar sensor device 6. Moreover, the limited standalone mode is activated if reliable measurements are not possible, because the lidar sensor data for instance are too noisy. This can for instance be the case if the vehicle/trailer combination 1 drives straight on and therefore the side walls 16, 18 of the trailer 3 are not visible. By the updating of the Kalman filter and thus by updating the kinematic model 8 within the limited standalone mode, the trailer 3 can also be characterized without continuously available measuring data.

Moreover the kinematic model 8 is updated also based on the geometric dimensions of the trailer 3, that is the length 24, the width 25, a length of a trailer coupling as well as based on a trailer type. In the present case, the trailer 3 is fastened on the towing vehicle 2 via a drawbar 27 or coupling bar. A further option for fastening the trailer 3 is a gooseneck. The width 25 of the trailer 3 is calculated from the geometry of the trailer 3 assumed by the kinematic model 8 and the determined trailer angle 22. The trailer type is changed, for instance between the regular trailer 3 and the gooseneck trailer, if the trailer width 25 has an unrealistic value. The length of the feature M and the wheelbase from the kinematic model 8, as already described, are moreover used, to adjust the length 24 of the trailer 3. In this connection a length 24 of the trailer 3 within the kinematic model 8 is only shortened if the length of the feature M exceeds a predetermined threshold value. The threshold value is for instance determined as one and a half the wheelbase of the trailer 3. The shortening of the trailer length 24 is consequently limited.

In summary, by the feature extraction of the trailer 3 as well as the estimation of the kinematic model 8 of the trailer 3 all trailer properties required for prediction of the motion of the trailer 3 are determined merely based on lidar sensor data and odometry information. In particular neither an input of the trailer properties by the driver, nor a communication with the trailer 3 itself is required.

The invention claimed is:

1. A method for characterizing a trailer attached to a towing vehicle, in which a kinematic model describing the trailer is given, the method comprising:
   a) receiving lidar sensor data of a lidar sensor device of the towing vehicle from an environmental region of the towing vehicle and the attached trailer, and identifying detection points corresponding to reflection points from the environmental region in the lidar sensor data;
   b) determining at least one model sub-region at least partially overlapping with the kinematic model;
   c) classifying the detection points lying within the model sub-region as detection points corresponding to the trailer;
   d) determining at least one feature of the trailer based on the detection points corresponding to the trailer;
   e) comparing the at least one feature with the kinematic model; and
   f) updating the kinematic model based on the comparison of the at least one feature with the kinematic model, wherein each model sub-region extends along an edge of the kinematic model, each edge representing a side wall of the trailer.

2. The method according to claim 1, wherein steps a) to f) are carried out during respective characterization cycles for characterizing the trailer, wherein the updated kinematic model determined in step f) during a characterization cycle is prescribed for a subsequent characterization cycle.

3. The method according to claim 1, wherein in step b) as the at least one model sub-region at least one model area is defined by which an edge of the kinematic model characterizing a wall of the trailer is framed.

4. The method according to claim 1, wherein in step d), at least one line fit is determined based on the detection points corresponding to the trailer of the at least one model sub-region, wherein a wall region of the trailer is characterized by the at least one line fit and the at least one feature is determined based on the at least one line fit.

5. The method according to claim 4, wherein for the detection points within a model sub-region, intensity values are determined, the detection points are filtered before the determination of the line fit by comparing the intensity values with a relative intensity threshold value, which is determined based on the intensity values of the detection points within the model sub-region, and the at least one line fit is determined based on the filtered detection points.

6. The method according to claim 1, wherein the kinematic model is determined as a function of a geometrical model of the trailer comprising at least one geometric parameter and as a function of at least one kinematic parameter, and for updating the kinematic model, the geometric model and/or the at least one kinematic parameter is updated based on the comparison of the at least one feature with the kinematic model.

7. The method according to claim 6, wherein as the at least one kinematic parameter a trailer angle between the trailer and the towing vehicle and/or a change of the trailer angle and/or a wheelbase of the trailer is determined and the at least one kinematic parameter is updated based on the comparison of the at least one feature with the kinematic model.

8. The method according to claim 6, wherein as the at least one geometric parameter a geometric dimension of the trailer and/or a length of the trailer coupling and/or a position at least of a pivot point of the trailer and/or a type of a coupling device of the trailer for appending to the towing vehicle is determined and the at least one geometric parameter is updated based on the comparison of the at least one feature and the kinematic model.

9. The method according to claim 8, wherein the at least one geometric dimension is only updated based on the comparison of the at least one feature with the kinematic model if the at least one geometric dimension is greater than a predetermined threshold value.

10. The method according to claim 1, wherein the kinematic model is additionally determined and updated as a function of odometry data of the towing vehicle, a speed of the towing vehicle and/or a steering angle of the towing vehicle.

11. The method according to claim 10, wherein in the event that no feature of the trailer for updating the kinematic model is determinable based on the lidar sensor data, the kinematic model is updated only based on the odometry data of the towing vehicle.

12. The method according to claim 6, wherein the kinematic model is implemented as an extended Kalman filter wherein the at least one kinematic parameter and the at least one geometric parameter are defined as internal states of the Kalman filter and the internal states are updated based on the lidar sensor data and/or based on odometry data of the towing vehicle.

13. The method according to claim 12, wherein a wheelbase of the trailer is implemented as an augmented state in the Kalman filter, which is updated only based on the feature of the trailer determined based on the lidar sensor data.

14. A driver assistance system for a vehicle/trailer combination formed by a towing vehicle and a trailer attached to the towing vehicle, comprising:
- at least one lidar sensor device for positioning on the towing vehicle and for detecting lidar sensor data from an environmental region of the vehicle/trailer combination; and
- a control device for performing a method comprising:
  a) receiving the lidar sensor data from the environmental region of the towing vehicle and the attached trailer, and identifies detection points corresponding to reflection points from the environmental region in the lidar sensor data;
  b) determining at least one model sub-region at least partially overlapping with a given kinematic model;
  c) classifying the detection points lying within the model sub-region as detection points corresponding to the trailer;
  d) determining at least one feature of the trailer based on the detection points corresponding to the trailer;
  e) comparing the at least one feature with the kinematic model; and
  f) updating the kinematic model based on the comparison of the at least one feature with the kinematic model, wherein each model sub-region extends along an edge of the kinematic model, each edge representing a side wall of the trailer.

15. A vehicle/trailer combination comprising a towing vehicle, a trailer coupled to the towing vehicle, and a driver assistance system according to claim 14.

* * * * *